(No Model.)

J. LE COMPTE.
SLEIGH.

No. 350,373. Patented Oct. 5, 1886.

WITNESSES:
John McCormick
Robt Morrin

INVENTOR:
Joseph Le Compte

UNITED STATES PATENT OFFICE.

JOSAPH LE COMPTE, OF TROY, NEW YORK.

SLEIGH.

SPECIFICATION forming part of Letters Patent No. 350,373, dated October 5, 1886.

Application filed April 16, 1886. Serial No. 199,123. (No model.)

*To all whom it may concern:*

Be it known that I, JOSAPH LE COMPTE, a citizen of the United States, residing at Troy, in the county of Rensselaer and State of New York, have invented certain new and useful Improvements in Sleighs, set forth in the following description and claims, reference being had to the accompanying drawings, signed by me and forming part of this specification, in which drawings—

Figure 1:
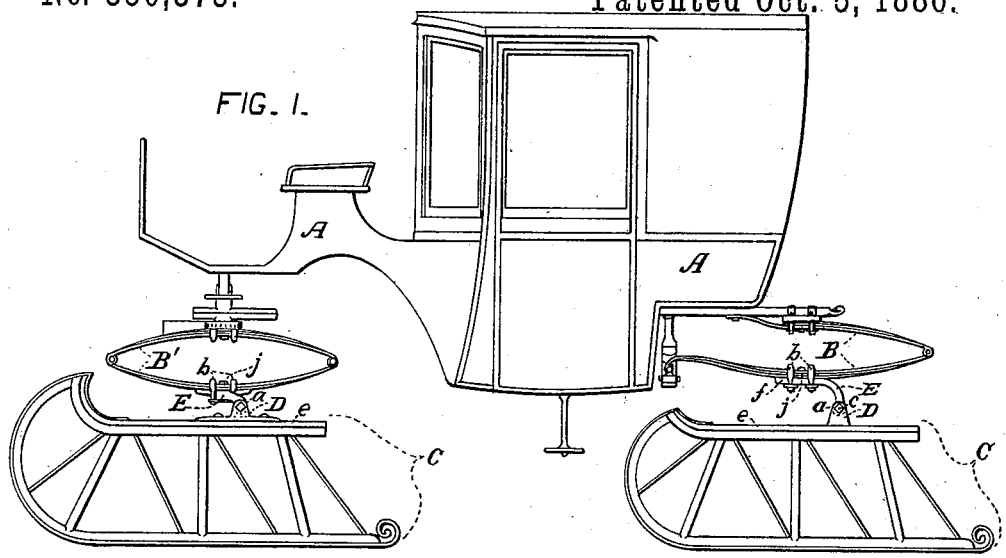
Figure 2:
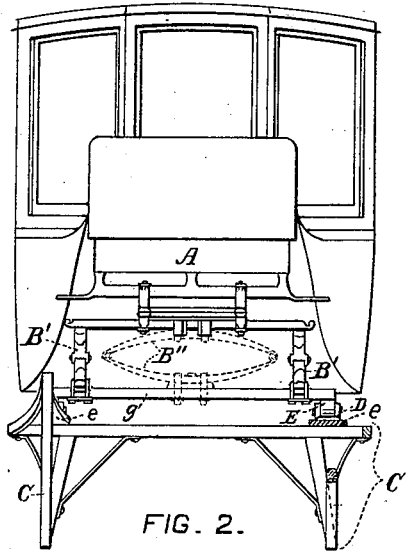

Figure 1 represents a side view of a sleigh-coach in which is embodied my invention. Fig. 2 is a front view, and Fig. 3 a rear view, of the same. Fig. 4 is a perspective view of a detached part of my invention. Figs. 5, 6, 7, and 8 are similar views of modified forms of part of my invention, as shown in Fig. 4.

Like characters refer to similar parts in the various figures.

My invention relates to supporting the bodies of coaches or similar vehicles having supporting yielding leaf or elliptic springs upon bob-sleigh runners, with a view to relieving such vehicle-bodies from a great part of the strain, jarring, and racking incident to such vehicle being drawn over an uneven, rough road, and also to permit the body of the vehicle, with its supporting-springs, being readily detached from the sleigh running-gear and securely attached to the axles of wheeled running-gear, or vice versa, whenever desired.

Figure 3:
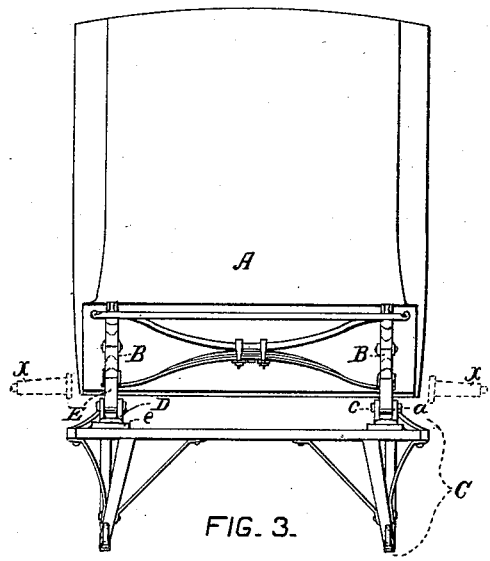
Figures 4, 5, 6, 7, 8:
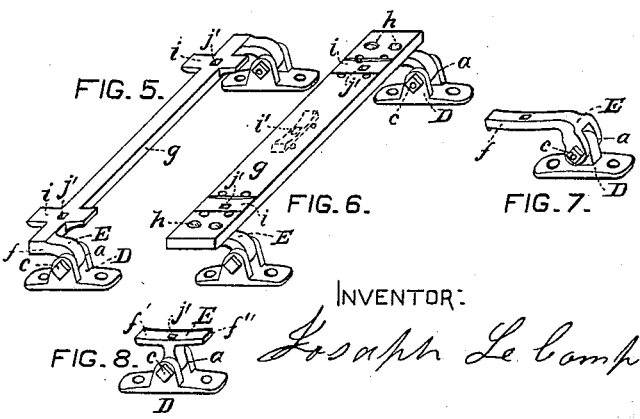

In the drawings, A, Figs. 1, 2, and 3, refers to the body of a road-vehicle; B, to springs secured to and supporting the rear end of the vehicle-body, and composed of layers or leaves, as in the usual manner of making such springs, and B' to elliptic springs arranged longitudinally with and made in a similar manner, secured to and supporting the forward end of the vehicle-body. It frequently occurs that instead of the two elliptic springs B', arranged longitudinally with the vehicle, a single elliptic spring, B", in dotted lines, Fig. 2, arranged transversely, is employed.

C are sleigh-bobs, shaped and constructed in the usual manner, which I provide with shackles, each of which shackles is composed of a lower part, D, and an upper part, E, hinged together at $a$. To the part E the spring B is shown, in Fig. 1, secured by means of clips $b$.

Although the joint $a$ is shown in the various figures formed by means of the bolt, pin, or rivet $c$, passing through cheek-pieces or ears $d$, formed on one of the parts D E and embracing a corresponding lug or tongue on the other of such parts, I do not confine myself to any exact known form or construction of such joint $a$, provided a longitudinal tilting motion is afforded to the part D and the bob C to which it is secured. The part D of each of the shackles is firmly and rigidly secured to the rave $e$ or corresponding part of the sleigh-bob by means of bolts or their equivalent; or, as indicated on the rear bob in Fig. 1, the part D may be made solid and in one piece with the rave $e$ of such bob. I locate the shackles with reference to the body of the vehicle so as not to project beyond the sides thereof, and on the bob C so that the joint $a$ and that portion of the load concentrated thereat shall be at such place between the front and rear of the bob as shall insure the well-running of the bob in its track, and in so doing it will commonly be found desirable, and even necessary, in substituting the bobs C for the wheels of a carriage to place the center of bearing (see $j$, Fig. 1) of the body-supporting springs forward of joint $a$, and in order to meet such emergency I provide the part E of the shackle with a forward-projecting arm, $f$, so arranged and having such shape as to permit the spring to be firmly secured thereto.

Whenever it may be desirable and expedient to have the line of bearing of the springs over that of the joint $a$, the part E, as shown in Fig. 8, may be provided with forwardly and rearwardly projecting arms $f'$ $f''$, shaped to form a bearing for the spring and for receiving the clips for firmly securing such spring thereto.

In cases when the springs, as shown at B', Fig. 2, are so near together as to make it undesirable or impracticable to secure the springs directly to the parts E of the shackles, or in such cases when there is but one transversely-arranged and centrally-located spring, as indicated by dotted lines B", Fig. 2, I connect the parts E of the shackles on both sides of the bob by means of a bar, $g$, either made in one piece with such parts E, substantially as shown in Figs. 2 and 5, or, if preferred, I make the bar $g$ of a separate piece and secure the same to parts E by means of bolts $h$ or their equivalents, substantially as shown in Fig. 6, the seats $i$ for the springs B', or seat $i'$ for the spring B'', being formed upon the bar $g$.

In adapting the parts E or the connecting-bar $g$ to have the leaf or elliptic springs, B, B', or B'', as the case may be, to be firmly secured thereto by means of clips $b$ or their equivalent, it is essential that that portion of the parts E of the shackles or the connecting-bar $g$ that shall form the seats for the springs shall be of such width and shape as to conform to that portion of the springs in contact therewith, and as the several layers of such springs are commonly secured together by means of a bolt, $j$, passing through the same, I provide the seats for such springs on the parts E or bar $g$ with a hole or socket, $j'$, to accommodate the head or nut of such bolt $j$.

When it is desired to convert a carriage or spring-wagon into a sleigh in accordance with my herein-described invention, the clips that commonly secure the springs to the axles of the vehicle are removed, and the body of the vehicle, with its supporting-springs, is detached from such axle and placed upon the sleigh-bobs provided therefor, the springs being secured to the parts E of the shackles or connecting-bar $g$, as the case may be, by means of clips $b$ or their equivalent, substantially as herein set forth.

It is obvious that in making a sleigh in accordance with my invention, as set forth, the body of the vehicle and its attached supporting-springs can, whenever required, be readily removed from the sleigh running-gear and secured to the axles of a wheeled running-gear, or vice versa, and that the manufacturer, by means of this invention, after having made a vehicle having the one form of running-gear, can, at a comparatively small additional expense, provide such vehicle with the other, and that when the vehicle-body and its supporting-springs is mounted either on the wheeled or sleigh running-gear such vehicle is in either case complete in itself, and does not necessarily have the appearance of a makeshift for a temporary occasion; and it is also obvious that in a sleigh embodying this invention, as shown and herein described, the shackles D E or portion of the bobs to which they are secured do not necessarily project beyond the sides of the body of the vehicle, so as to be liable to interfere with other vehicles or objects in passing or being passed by them.

I am aware that it has been proposed to convert carriages and wagons into sleighs by removing the wheels from the axles of such vehicles, and mounting the bodies and their supporting-springs with the axles secured thereto upon sleigh runners or bobs, provided with devices for receiving the ends of such axles; but such contrivances, in addition to their appearing unhandsome in the eyes of some persons, are also found objectionable, in so much that the axles (see dotted lines $x$, Fig. 3) and devices on sleigh runners or bobs for receiving and supporting such axles in lieu of wheels must necessarily project so far beyond the sides of the body of the vehicle as to be liable to collide with objects in passing or being passed by them, and I do not claim such device as of my invention.

What I claim as my invention is—

1. In a sleigh, the body provided with leaf or elliptic supporting-springs, in combination with a bob provided with shackles, each of which shackles is composed of a part, D, firmly and rigidly secured to the bob, and a part, E, hinged at $a$ to part D, and provided with a longitudinally-projecting arm or arms to which a longitudinally-arranged body-supporting spring is firmly secured by means of clips, substantially as shown and described.

2. In a sleigh, the body provided with leaf or elliptic supporting-springs, in combination with a bob provided with shackles composed of parts D, firmly and rigidly secured to the raves of the bob, and the parts E, hinged at $a$ to part D, and provided with forwardly-projecting arms $f$, connected by means of bar $g$, having thereupon secured by means of clips a body-supporting spring or springs of a vehicle, substantially as shown and described.

3. In a sleigh, the body A, provided with leaf or elliptic supporting-springs B and B' or B'', in combination with front and rear bobs, C, each of which bobs is provided with shackles composed of parts D, firmly and rigidly secured to the raves $e$ of the bob, and the parts E, forming hinged joints $a$ with parts D, and having forwardly-projecting arms $f$, the arms $f$ of shackles on rear bob having springs B secured thereupon, and the arms $f$ of shackles on forward bob being connected by bar $g$, having secured thereupon the spring B' or B'', by means of clips $b$, substantially as shown and set forth.

4. A sleigh-bob provided with shackles, each of which shackles is composed of a part, D, firmly and rigidly secured to the bob, and a part, E, hinged at $a$ to part D, and provided with the forwardly-projecting arm $f$, shaped and adapted to have secured thereupon a longitudinally-arranged leaf or elliptic body-supporting spring of a vehicle, or the end portion of a spring-sustaining connecting-bar $g$ of a vehicle, substantially as shown and described.

In testimony whereof I hereunto set my hand this 14th day of April, 1886.

JOSAPH LE COMPTE.

Witnesses:
WM. C. GEER,
THEO. T. CHASE.